US010546394B2

(12) United States Patent
Borrel et al.

(10) Patent No.: US 10,546,394 B2
(45) Date of Patent: Jan. 28, 2020

(54) UNCERTAINTY VISUALIZATION

(71) Applicant: International Business Machines Corporation, Armonk, NY (US)

(72) Inventors: Paul Borrel, Rio de Janeiro (BR); Alvaro Bueno Buoro, Rio de Janeiro (BR); Carmen Nilda Mena Paz, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 15/246,648

(22) Filed: Aug. 25, 2016

(65) Prior Publication Data

US 2018/0061100 A1   Mar. 1, 2018

(51) Int. Cl.
G06T 11/00   (2006.01)

(52) U.S. Cl.
CPC .................... G06T 11/00 (2013.01)

(58) Field of Classification Search
CPC ....... G06T 11/60; G06T 11/206; G06N 5/048; G06N 7/005
See application file for complete search history.

(56) References Cited

U.S. PATENT DOCUMENTS

| | | | |
|---|---|---|---|
| 6,826,486 B1* | 11/2004 | Malinverno | ............ E21B 44/00 367/73 |
| 7,889,210 B2 | 2/2011 | Borrel | |
| 8,693,752 B2 | 4/2014 | Lundstrom | |
| 2013/0308827 A1* | 11/2013 | Dillavou | ............... G06T 7/20 382/107 |
| 2014/0143652 A1* | 5/2014 | DeLoach | ............. G06F 17/212 715/234 |
| 2014/0200863 A1* | 7/2014 | Kamat | .................. G01C 15/00 703/1 |
| 2015/0206060 A1* | 7/2015 | Coles | ..................... G06N 7/005 706/12 |
| 2017/0261949 A1* | 9/2017 | Hoffmann | ............. G06N 7/005 |

OTHER PUBLICATIONS

Unknown; "Case study: Visualising uncertainty"; dataviz; Improving visualisation—Case study: Visualising uncertainty; OCSI; Copyright 2009; pp. 4; Printed Aug. 24, 2016; <http://www.improving-visualisation.org/case-studies/id=3>.
Unknown; "MSNBC hurricane maps are live"; stamen design—MSNBC hurricane maps are live; pp. 3; Printed Aug. 24, 2016; <http://content.stamen.com/msnbc_hurricane_maps_are_live>.
Bonneau, Georges-Pierre et al.; "Overview and State-of-the-Art of Unvertainty Visualization"; Springer; for Research & Development; Sep. 19, 2014; pp. 8; Printed Aug. 24, 2016; <http://rd.springer.com/chapter/10.1007/978-1-4471-6497-5_1>.

* cited by examiner

*Primary Examiner* — Howard Cortes
(74) *Attorney, Agent, or Firm* — Michael A. Petrocelli

(57) ABSTRACT

A system, method and program product for annotating visualizations with uncertainty information. A system is provided that includes a visualization importer that imports a generated visualization; an uncertainty processor that locates a region of uncertainty in the generated visualization; and a graphics annotator that generates an annotated visualization having uncertainty artifacts that visually identify the region of uncertainty.

12 Claims, 6 Drawing Sheets

UNCERTAINTY VISUALIZATION

TECHNICAL FIELD

The subject matter of this invention relates to visualizations, and more particularly to a system and method of depicting uncertainty within computer generated visualizations.

BACKGROUND

Decision making in many industries and in many specific use cases is often based on uncertain information. For example, in financial applications, a value at risk, which results from complex mathematical calculations based on an assessment of the uncertainty of input data, is calculated prior to investment decisions. Likewise, for multi-million dollar investment decisions, the oil and gas industry relies on the generation of simulations or models of underground geological formations and spatial distributions. Such simulations are based on seismic interpretations, well logs, well tests, etc.

In general, visualization software assists decision makers in their task by providing simulations based on complex mathematical concepts. The results of the simulations are presented to the decision makers through some visualization of the most relevant parameters. The type of visualization varies widely across industries and applications. It can range from simple pie-charts and bar-charts in financial applications, to complex immersive three dimensional (3D) representations of the underground for the petroleum industry, or to virtual reality flythrough of 3D computer aided design (CAD) models of mechanical assemblies.

Regardless of the nature and complexity, visualizations do not generally connote information with complete accuracy. Inaccuracies may for example arise due to flawed modeling techniques as well as incomplete or bad input, such as noisy, poorly sampled, and imprecise data.

SUMMARY

Aspects of the disclosure provide a system and method of annotating visualizations with uncertainty information in an application-agnostic manner. This approach allows any computer generated visualization to be modified to include graphic artifacts that represent regions of uncertainty.

A first aspect provides an uncertainty annotation system that modifies generated visualizations with uncertainty artifacts to provide annotated visualizations, including: a visualization importer that imports a generated visualization; an uncertainty processor that locates a region of uncertainty in the generated visualization; and a graphics annotator that generates an annotated visualization having uncertainty artifacts that visually identify the region of uncertainty.

A second aspect provides a computer program product stored on a computer readable storage medium, which when executed by a computing system, provides annotated visualizations, the program product including: program code that imports a generated visualization; program code that locates a region of uncertainty in the generated visualization; and program code that generates an annotated visualization having uncertainty artifacts that visually identify the region of uncertainty.

A third aspect provides a computerized method that generates annotated visualizations, comprising: importing a generated visualization; locating a region of uncertainty in the generated visualization; and generating an annotated visualization having uncertainty artifacts that visually identify the region of uncertainty.

BRIEF DESCRIPTION OF THE DRAWINGS

These and other features of this invention will be more readily understood from the following detailed description of the various aspects of the invention taken in conjunction with the accompanying drawings in which.

Figure 1:
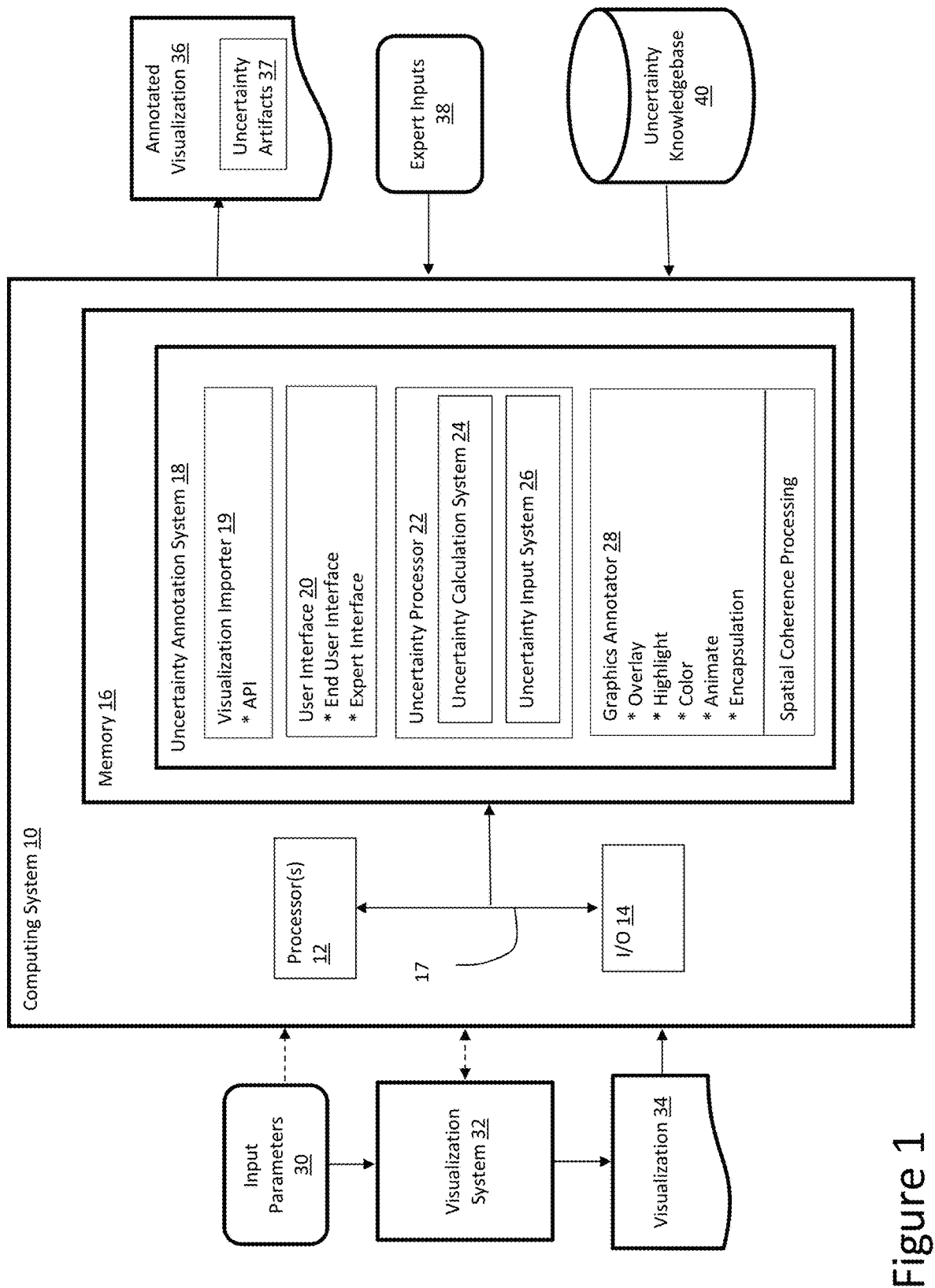
FIG. 1 shows a computing system having an uncertainty annotation system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

There exist numerous third party applications for generating visualizations that assist users in decision making efforts. For the purposes of this disclosure, the term "visualization" generally refers to graphical representations of abstract business, manufacturing and scientific data. As noted, visualizations are often generated based on inaccurate or incomplete data and/or modeling that results in some uncertainty of the information being displayed. Users must thus take into account such uncertainty. The present approach provides a platform for graphically annotating visualizations generated by third party applications with uncertainty artifacts. The resulting annotated visualizations allow users to quickly identify regions of uncertainty and more accurately interpret the information.

Referring now to the drawings, FIG. 1 depicts a computing system 10 having an uncertainty annotation system 18 that imports a visualization 34 and generates an annotated visualization 36 that includes uncertainty artifacts 37. The original visualization 34 may be generated by any visualization system 32 based on a set of input parameters 30. Visualization 34 may be provided in any file format, e.g., OpenGL, JT, GMV (General Mesh Viewer), Analyze, Vis5D, Xmdv, etc. As described herein, uncertainty artifacts 37 include graphical alterations that visually identify regions where uncertainty is determined to exist and visually represent the amount and nature of uncertainty in these regions (e.g., the artifact may provide a location, amount, type, confidence level, probability, etc., of the uncertainty). Graphical alterations may include, e.g., highlighting, blurring, animations, colorations, encapsulation, etc., to identify a location of uncertainty. Variations, such as the use of different colors, highlighting etc., may be used to describe some characteristic of the uncertainty, e.g., confidence level, etc.

Uncertainty annotation system 18 generally includes: a visualization importer 19 that for example includes an application programming interface (API) for importing visualizations 34 in different file formats; a user interface 20 that allows both an end-user and expert to interact with the annotation process; an uncertainty processor 22 that determines regions of uncertainty in the imported visualization 34, e.g., based on calculations and/or inputs, including, e.g., expert inputs 38 and/or inputs from an uncertainty knowledgebase 40; and a graphics annotator 28 that visually alters the original visualization 34 to generate the annotated visualization 36.

As noted, uncertainty processor 22 locates regions of uncertainty in the imported visualization 34. In some cases, there is no a priori knowledge of where the regions of uncertainty reside. To address this situation, an uncertainty calculation system 24 is utilized to calculate and determine such regions. One such calculation is implemented by having the user of visualization system 32 run the same simulation several times, using different values of the input parameters 30 to generate a set of related visualizations 34 that yield slightly different results or versions. Uncertainty calculation system 24 can then process the different versions by, e.g., comparing image data, averaging image data, filtering image data, etc., to identify regions that differ from version to version. The regions that differ are flagged as uncertain.

Alternatively, situations occur when a priori knowledge of information associated with uncertainties exist in a visualization 34. In this case, expert inputs 38 or information from an uncertainty knowledgebase 40 may be utilized by uncertainty input system 26 to annotate the visualization 34. For example, an analyst (i.e., expert) may know from experience which regions of a given visualization 34 are likely accurate and which are not accurate. The analyst may provide expert inputs 38 via user interface 20 that reflect a level of confidence in different regions being displayed. Alternatively, the current visualization 34 and associated input parameters 30 used to generate the visualization 34 may be compared to previous examples (e.g., original and annotated visualizations) stored in uncertainty knowledgebase 40. If similar visualizations exist, associated uncertainty information can be used by uncertainty processor 22 to automatically identify regions of uncertainty.

Once all regions of uncertainty are identified by the uncertainty processor 22, graphics annotator 28 annotates the imported visualization 34. Annotations may for example include uncertainty artifacts 37 such as image overlays, highlights, colorizations, animations, encapsulations, etc., that visually identify the regions of uncertainty. In addition, graphics annotator 28 may include spatial coherence processing to ensure any annotations dynamically track the presentation of the annotated visualization 36. For example, if an end user, via user interface 20, manipulates the annotated visualization 34, e.g., by zooming, rotating, etc., any artifacts 37 will be spatially maintained in the displayed view. Graphics annotator 28 may for example be implemented using the teachings of U.S. Pat. No. 7,889,210, entitled Visual Integration Hub, issued on Feb. 15, 2011, which is hereby incorporated by reference.

Figure 2:
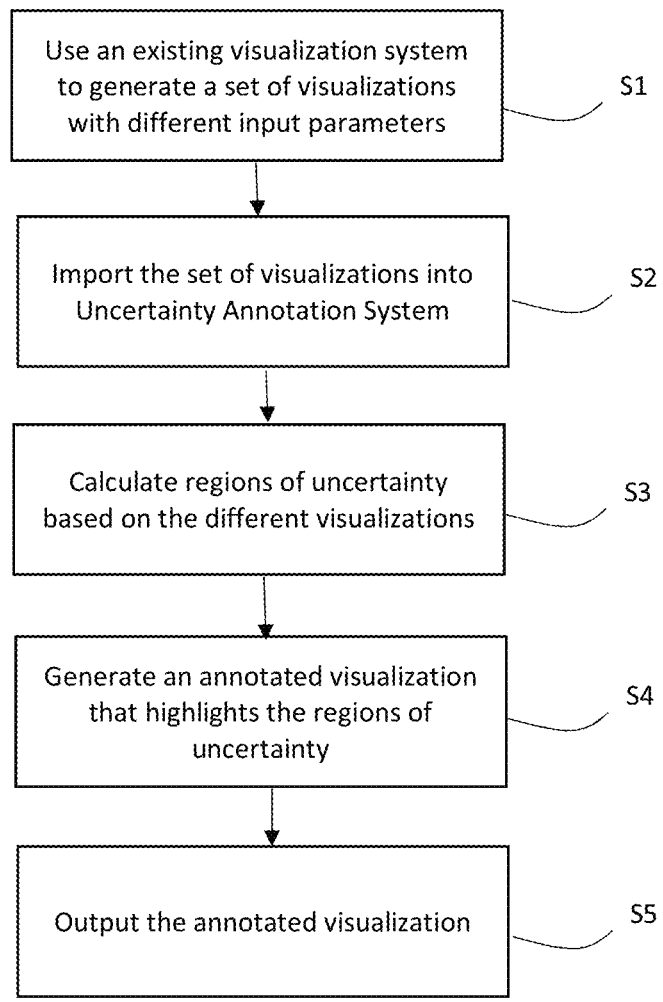
FIG. 2 shows a flow chart of a method of implementing an uncertainty annotation system according to embodiments.

FIG. 2 depicts a flow diagram of a process of using uncertainty annotation system 18 (FIG. 1) in which no a priori knowledge of uncertainty exists. At S1, an existing (i.e., third party) visualization system 32 is utilized to generate a set of visualizations 34 with different input parameters 30. At S2, the set of visualizations are imported into the uncertainty annotation system 18, and at S3 regions of uncertainty are located based on the different versions of the visualizations 34 by uncertainty processor 22. At S4, an annotated visualization 36 is generated by graphics annotator 28 that introduces artifacts that highlight and characterize the regions of uncertainty (e.g., provides a location, amount, type, confidence level, probability, etc., of the uncertainty) in the visualization and at S5, the annotated visualization 36 is outputted.

Figure 4:
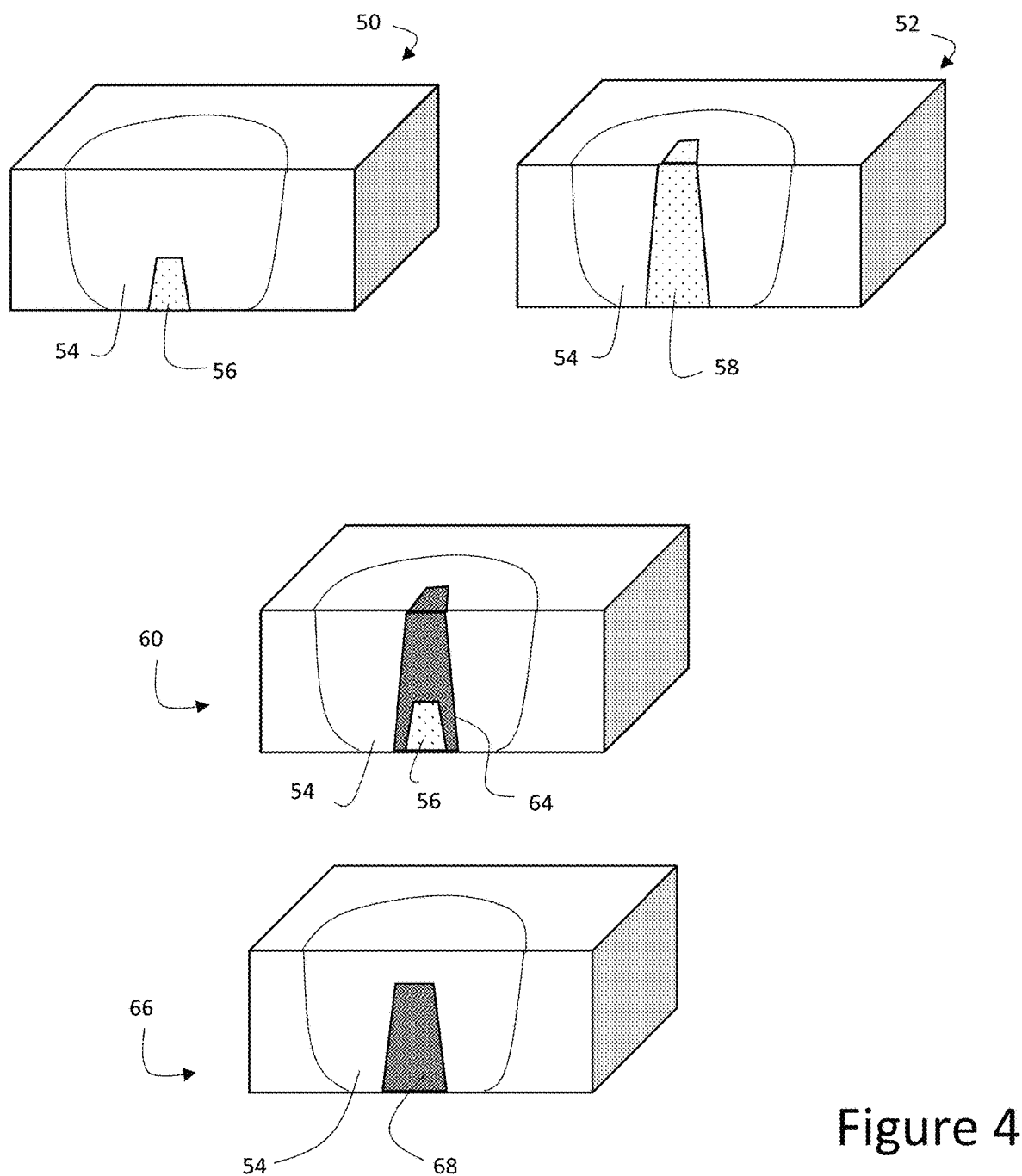
FIG. 4 depicts an example of processing visualizations according to embodiments.

FIG. 4 depicts an associated example that further explains the process shown in FIG. 2 in which a set of two visualizations 50 and 52 are generated by an existing visualization system 32. Visualizations 50, 52 represent 3D images generated by a geo-mechanic simulator of an oil reservoir showing vertical displacements that depend on input parameters 30 such as the behavior of fractures within the reservoir. As can be seen, the displacement shown by region 54 is the same in both visualizations 50, 52. However, a second displacement shown by regions 56, 58 differs between the two visualizations 50, 52. Based on these differences, uncertainty calculation system 24 can calculate a region of uncertainty and generate an annotated visualization. Two possible annotated visualizations 60, 66 are shown. In annotated visualization 60, the region of uncertainty 64 is determined by comparing the two original visualizations 50, 52 to identify any area that is not common between the two. This area or region of uncertainty 64 is then shown in a darker color to visually highlight the uncertainty. In annotated visualization 66, the different displacements 56, 58 from visualizations 50, 52 are graphically averaged to arrive at second possible region of uncertainty 68.

Figure 3:
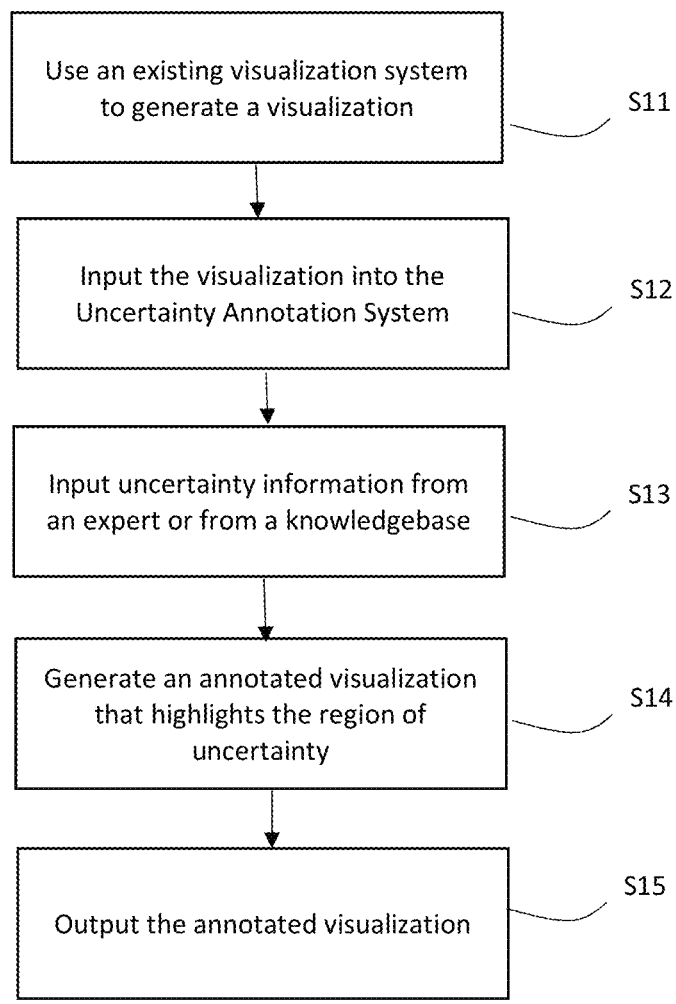
FIG. 3 shows a flow chart of an alternative method of implementing an uncertainty annotation system according to embodiments.

FIG. 3 depicts a flow diagram of a process of using uncertainty annotation system 18 (FIG. 1) in which some a priori knowledge of uncertainty is provided. In this case, an existing visualization system 32 is used to generate a visualization 34 at S11 and at S12, the visualization is imported into the uncertainty annotation system 18. At S13, uncertainty information is gathered, either manually via user interface 20 as expert inputs 38 or as inputs from uncertainty knowledgebase 40. The inputs are processed by uncertainty processor 22 to locate regions of uncertainty, and at S14, an annotated visualization 36 is generated by graphics annotator 28 with artifacts that visually identify the regions of uncertainty and the nature of the uncertainty in the visualization (e.g., the artifact provides a location, amount, type, confidence level, probability, etc., of the uncertainty). Finally at S15, the annotated visualization 36 is outputted.

Figure 5:
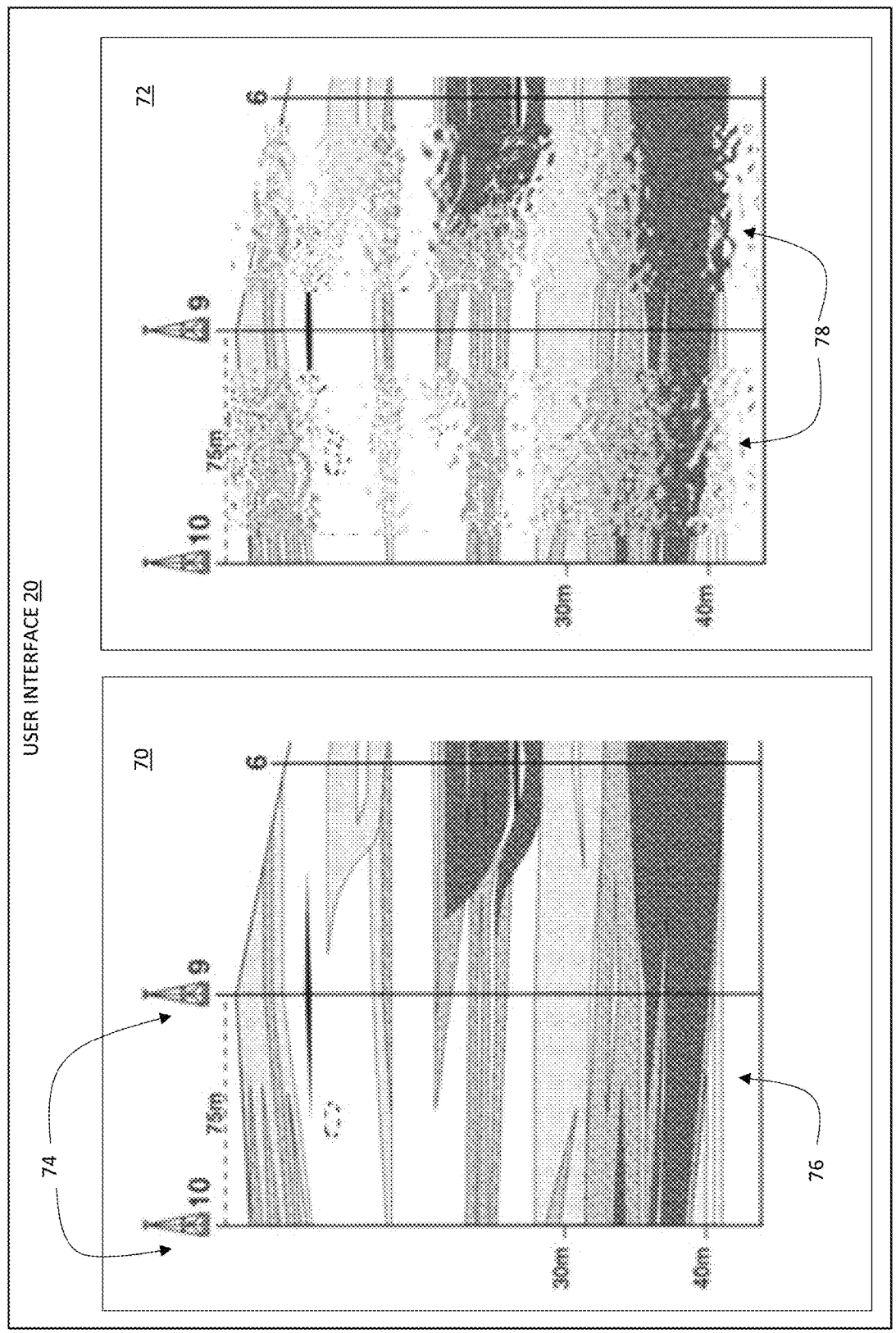
FIG. 5 depicts a further example of processing visualizations according to embodiments.
Figure 6:
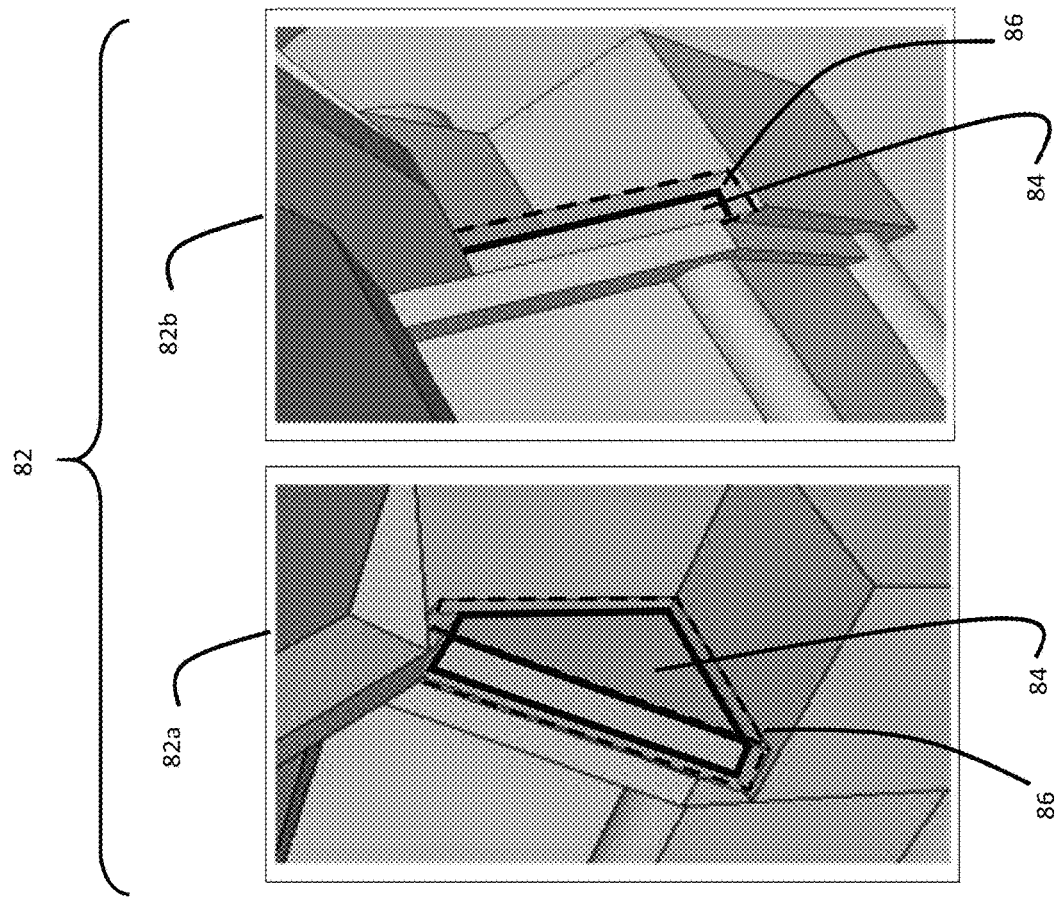
FIG. 6 depicts a further example of processing visualizations according to embodiments.
Figure 6:
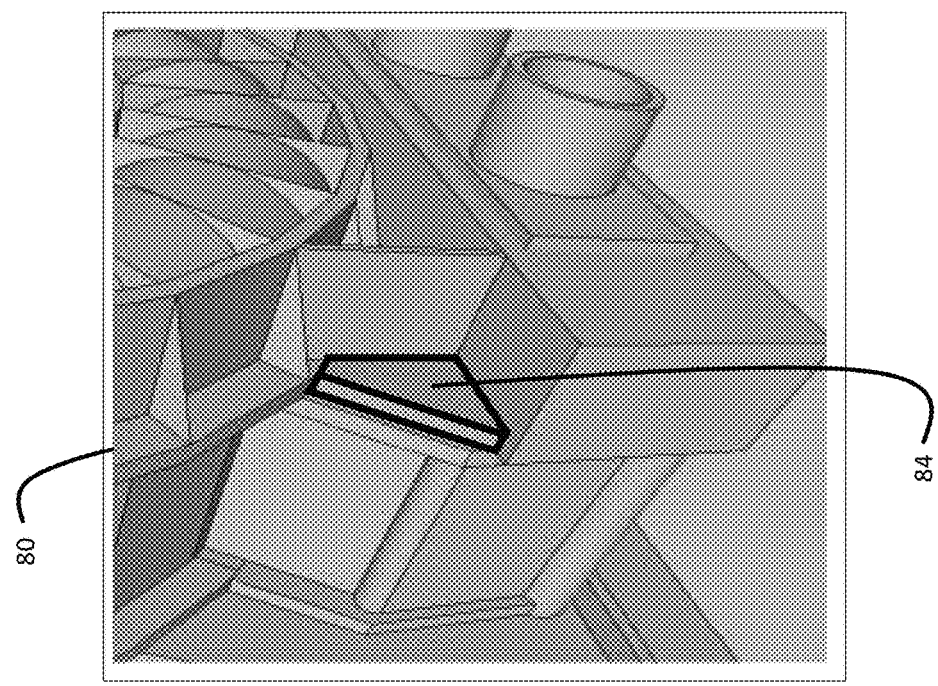

FIGS. 5 and 6 depict examples of this process. FIG. 5 depicts a user interface 20 that shows an original visualization 70 and an annotated visualization 72 side by side. The original visualization 70 depicts geological layers 76 with the location of drill wells 74. The different color values in the geological layers 76 depict predicted or simulated formations (e.g., sand, bedrock, etc.), which are simulated as continuous areas. The formations are arrived at, e.g., based on measurements and other data collected during the drilling of wells 74.

Uncertainty annotation system 18 (FIG. 1) is utilized to generate the annotated visualization 72. In this case, it may be determined, based on information in uncertainty knowledgebase 40 or expert inputs 38 that simulated areas outside of 10 meters around a drill well are generally not reliable. These areas are thus calculated as regions of uncertainty by uncertainty processor 22, and are then "blurred" by graphics annotator 28. The resulting outputted visualization 72 includes the resulting regions of uncertainty as blurred areas 78.

FIG. 6 depicts a further example that shows an original visualization 80 and an annotated visualization 82, shown in two views 82a, 82b. The original visualization 80 depicts a simulation of a piece of machinery that includes part 84. The original visualization 80 is processed by uncertainty annotation system 18 (FIG. 1) to generate an annotated visualization 82 that can be viewed in the user interface 20 from different perspectives. A region of uncertainty 86 is calculated and used to alter the annotated visualization 82. In this case, the region of uncertainty may represent a manufacturing tolerance that is known to exist with part 84 (i.e., part 84 may sometimes be manufactured larger than what is shown in the original visualization 80). The annotated image thus includes an encapsulation around part 84 that shows the potential variation. The tolerance information may be determined based on information in uncertainty knowledgebase 40 or expert inputs 38 (FIG. 1). Also of note in FIG. 6 is the fact that the region of uncertainty 86 maintains spatial coherence with the original visualization 80 as the image is manipulated, e.g., from view 82a to 82b. In other words, regardless of how the annotated visualization 82 is viewed (zoomed, rotated, etc.) the artifact that depicts the uncertainty is spatially maintained in the image.

As is evident, artifacts may be incorporated in many different ways to depict uncertainty in a visualization. For example, a uniform transparent screen could be added over regions of uncertainty. This can be used to produce a blurred image and is most applicable to the situations where uncertainty is homogeneous and only located in some zones of the total image. Other options include reducing transparency as the image is zoomed in, so as to avoid getting a clear view on regions of uncertainty. Still other options include the creations of three dimensional encapsulating shapes, such as cylinders around a region of uncertainty.

Other options may include generating an animated picture, where the animation is created by successively displaying various rendered versions of the same graphical object. For example, the animation could include the blinking of a specific object on the screen. Alternatively, the animation may include successively displaying the original image at various values of a parameter. It is noted that all these approaches can be done at the graphics (e.g., pixel) level and do not require access to the underlying model or code used to generate graphics from the simulation model.

There are any number of possible ways for the annotated visualization 36 to be displayed and/or manipulated by users. The annotated visualization 36 can replace the original visualization 34 so that the user of the uncertainty annotation system 18 sees and interacts with the annotated visualization 36 instead of the original visualization 34. Further, the display interface of the original system 32 can be duplicated, with the original visualization 34 replaced by the annotated version. In one embodiment, the graphics annotator 28 could automatically maintain the same viewpoint as the original as the user interacts with the original visualization system 32. In another embodiment, the annotated visualization 36 can be manipulated within the user interface 20 of the graphics annotation system 18 and not through the original system 32.

The modifications of the visualization 34 may depend on the type of elements (i.e., objects) being displayed. One approach is to separately process each of the visual elements in the original visualization 34, and merge the results. There are various ways to identity the elements in the original visualization 34. For example, through an interaction with the graphics annotator 28, the user can be charged to define each element type and the amount of associated uncertainty.

In one illustrative embodiment, the content of the graphics API calls can be examined to identify different types of objects (e.g., by searching for the "pushmatrix" calls in an OpenGL implementation). The identification can further be validated or refined by an interaction with the user via the graphics annotator 28. The original system 32 that generates the visualizations can be run separately on each of the object types, so as to generate a separate picture (that can be modified to account for uncertainty) for each type and eventually assembled to reconstruct the whole picture.

It is understood that uncertainty annotation system 18 may be implemented as a computer program product stored on a computer readable storage medium. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the uncertainty annotation system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An uncertainty annotation system that modifies generated visualizations with uncertainty artifacts to provide annotated visualizations, comprising:

a visualization importer that imports a generated visualization generated using a set of input parameters, the generated visualization comprising an image containing a graphical representation of data;

an uncertainty processor that locates a region of uncertainty in the generated visualization, wherein the uncertainty processor is configured to:

obtain a plurality of previously generated visualizations, wherein each of the previously generated visualizations includes an image containing a graphical representation of the data, and wherein each of the previously generated visualizations is generated using a different set of the input parameters; and locate the region of uncertainty based on a comparison of the images from the previously generated visualizations;

a graphics annotator that generates an image overlay containing a graphical representation of uncertainty artifacts representing a location of the region of uncertainty in the generated visualization and an amount and nature of the uncertainty in the generated visualization, that generates an annotated visualization by combining the image overlay and the generated visualization, and that displays the annotated visualization to a user on a display; and a spatial coherence processor that spatially maintains a position of the image overlay of the uncertainty artifact on the generated visualization on the display, as the user manipulates a view of the annotated visualization on the display using a user interface.

2. The uncertainty annotation system of claim 1, wherein the visualization importer includes an application programming interface for importing different visualization file formats.

3. The uncertainty annotation system of claim 1, wherein the uncertainty processor includes an uncertainty input system for an obtaining the previously generated visualizations from an uncertainty knowledgebase.

4. The uncertainty annotation system of claim 1, wherein the uncertainty artifacts provide at least one of an amount, type, confidence level, and probability, of the uncertainty.

5. A computer program product stored on a computer readable storage medium, which when executed by a computing system, provides annotated visualizations, the program product comprising:
program code that imports a generated visualization generated using a set of input parameters, the generated visualization comprising an image containing a graphical representation of data;
program code that locates a region of uncertainty in the generated visualization, wherein the region of uncertainty is located by:
obtaining a plurality of previously generated visualizations, wherein each of the previously generated visualizations includes an image containing a graphical representation of the data, and wherein each of the previously generated visualizations is generated using a different set of the input parameters; and
locating the region of uncertainty based on a comparison of the images from the previously generated visualizations;
program code that generates an image overlay containing a graphical representation of uncertainty artifacts representing a location of the region of uncertainty in the generated visualization and an amount and nature of the uncertainty in the generated visualization, that generates an annotated visualization by combining the image overlay and the generated visualization, and that displays the annotated visualization to a user on a display; and
program code that spatially maintains a position of the image overlay of the uncertainty artifact on the generated visualization on the display, as the user manipulates a view of the annotated visualization on the display using a user interface.

6. The computer program product of claim 5, wherein the program code that imports includes an application programming interface for importing different visualization file formats.

7. The computer program product of claim 5, wherein the program code that locates the region of uncertainty includes program code for obtaining the previously generated visualizations from an uncertainty knowledgebase.

8. The computer program product of claim 5, wherein uncertainty artifacts provide at least one of an amount, type, confidence level, and probability, of the uncertainty.

9. A computerized method that generates annotated visualizations, comprising:
importing a generated visualization generated using a set of input parameters, the generated visualization comprising an image containing a graphical representation of data;
locating a region of uncertainty in the generated visualization, wherein the region of uncertainty is located by:
obtaining a plurality of previously generated visualizations, wherein each of the previously generated visualizations includes an image containing a graphical representation of the data, and wherein each of the previously generated visualizations is generated using a different set of the input parameters; and
locating the region of uncertainty based on a comparison of the images from the previously generated visualizations;
generating an image overlay containing a graphical representation of uncertainty artifacts representing a location of the region of uncertainty in the generated visualization and an amount and nature of the uncertainty in the generated visualization, generating an annotated visualization by combining the image overlay and the generated visualization, and displaying the annotated visualization to a user on a display; and
spatially maintaining a position of the image overlay of the uncertainty artifact on the generated visualization on the display, as the user manipulates a view of the annotated visualization on the display using a user interface.

10. The computerized method of claim 9, wherein the importing includes providing an application programming interface for importing different visualization file formats.

11. The computerized method of claim 9, wherein locating the region of uncertainty includes and obtaining the previously generated visualizations from an uncertainty knowledgebase.

12. The computerized method of claim 9, wherein the uncertainty artifacts provide at least one of an amount, type, confidence level, and probability, of the uncertainty.

* * * * *